United States Patent
Jan (10) Patent No.: US 9,128,223 B2
(45) Date of Patent: Sep. 8, 2015

(54) METHOD OF ALIGNING AND ASSEMBLING AN IMAGE CAPTURING MODULE

(71) Applicant: LARVIEW TECHNOLOGIES CORP., Taoyuan County (TW)

(72) Inventor: Shin-Dar Jan, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 66 days.

(21) Appl. No.: 14/065,380

(22) Filed: Oct. 28, 2013

(65) Prior Publication Data

US 2015/0116580 A1 Apr. 30, 2015

(51) Int. Cl.
  *H04N 5/217* (2011.01)
  *H04N 5/232* (2006.01)
  *G02B 7/00* (2006.01)
  *H04N 5/225* (2006.01)

(52) U.S. Cl.
  CPC .............. *G02B 7/003* (2013.01); *H04N 5/2254* (2013.01)

(58) Field of Classification Search
  CPC .................................................... H04N 5/2178
  USPC ................................................. 348/357, 373
  See application file for complete search history.

(56) References Cited

U.S. PATENT DOCUMENTS

2005/0024504 A1* 2/2005 Hoshi ..................... 348/231.3

FOREIGN PATENT DOCUMENTS

TW 201318420 A1 5/2013

* cited by examiner

*Primary Examiner* — Joel Fosselman
(74) *Attorney, Agent, or Firm* — Li & Cai Intellectual Property (USA) Office (57) ABSTRACT

An image capturing module includes an image sensing unit and an actuator unit. The image sensing unit includes a circuit substrate and an image sensing chip disposed on the circuit substrate. The actuator unit includes a housing frame disposed on the circuit substrate and a movable lens assembly movably disposed inside the housing frame. The image sensing chip includes an image sensing area having a first geometric center line and a first geometric center point, and the movable lens assembly has a second geometric center line and a second geometric center point. Whereby, when the predetermined energy is provided for the actuator unit to shift the movable lens assembly, the second geometric center line (or the second geometric center point) of the movable lens assembly can be accurately aligned with the first geometric center line (or the first geometric center point) of the image sensing area.

10 Claims, 14 Drawing Sheets

METHOD OF ALIGNING AND ASSEMBLING AN IMAGE CAPTURING MODULE

BACKGROUND OF THE INVENTION

1. Field of the Invention

The instant disclosure relates to an image capturing module and a method of aligning and assembling the same, and more particularly to an image capturing module and a method of aligning and assembling the same, for accurately aligning the center position of a movable lens assembly with the center position of an image sensing chip.

2. Description of Related Art

Recently, it becomes more and more popular for portable devices such as mobile phones or PDA to be equipped with an imaging module. Furthermore, since the market requires these portable devices to have more powerful functions and smaller sizes, it is necessary for the imaging module to generate high quality pictures and to be of small size accordingly. One improvement of picture quality is to increase the number of pixel. The pixel number of an imaging module has already increased from the VGA-level 30 pixels to 2, 5, 8, 13 or even 41 million pixels, which is now common in the market. Another improvement lies in the definition of the image. Thus, the imaging module of a portable device also develops from a fixed-focus mode to auto-focus mode or even optical zoom mode.

The auto-focus mode employs the principle of moving the lens along Z direction in the imaging module suitably according to various distances of targets, whereby the optical image of the desired target can be focused correctly on an image sensor so as to generate a clear image. The common ways of activating the lens to move in the imaging module include activating by a stepping motor, piezoelectric motor and voice coil motor (VCM). However, when the lens is moved by using the motor along X or Y direction, the lens of the imaging module cannot accurately align with the center position of the image sensor.

SUMMARY OF THE INVENTION

One aspect of the instant disclosure relates to an image capturing module and a method of aligning and assembling the same.

One of the embodiments of the instant disclosure provides a method of aligning and assembling an image capturing module, comprising: providing an image sensing unit and an actuator unit, wherein the image sensing unit includes an image sensing chip, and the actuator unit includes a housing frame having a predetermined position point or a predetermined position line and a movable lens assembly movably disposed inside the housing frame; providing a predetermined energy for the actuator unit, wherein the center position of the movable lens assembly relative to the predetermined position point or the predetermined position line of the housing frame is shifted to a fixed offset location, for obtaining a predetermined horizontal direction and a predetermined horizontal distance from the predetermined position point or the predetermined position line of the housing frame to the center position of the movable lens assembly; removing the predetermined energy; horizontally shifting the predetermined position point or the predetermined position line of the housing frame relative to the center position of the image sensing chip along a predetermined horizontal offset direction and by a predetermined horizontal offset distance, wherein the predetermined horizontal direction is opposite to the predetermined horizontal offset direction, and the predetermined horizontal distance is the same as the predetermined horizontal offset distance; and then, fixing the actuator unit on the image sensing unit, when the predetermined position point or the predetermined position line of the housing frame relative to the center position of the image sensing chip has been horizontally shifted along the predetermined horizontal offset direction and by the predetermined horizontal offset distance.

More precisely, after the step of fixing the actuator unit on the image sensing unit, the method further comprises: providing the predetermined energy for the actuator unit again, wherein the center position of the movable lens assembly relative to the predetermined position point or the predetermined position line of the housing frame is shifted again to the fixed offset location, thus the center position of the movable lens assembly is accurately aligned with the center position of the image sensing chip.

More precisely, the image sensing chip has an image sensing area formed on the top side thereof, the image sensing area has a first geometric center line, the movable lens assembly has a second geometric center line, and the predetermined position line of the housing frame is a third geometric center line. In addition, after the step of fixing the actuator unit on the image sensing unit, the method further comprises: providing the predetermined energy for the actuator unit again, wherein the second geometric center line of the movable lens assembly relative to the third geometric center line of the housing frame is shifted again to the fixed offset location, thus the second geometric center line of the movable lens assembly is accurately aligned with the first geometric center line of the image sensing area.

More precisely, the image sensing chip has an image sensing area formed on the top side thereof, the image sensing area has a first geometric center point, the movable lens assembly has a second geometric center point, and the predetermined position point of the housing frame is a third geometric center point. In addition, after the step of fixing the actuator unit on the image sensing unit, the method further comprises: providing the predetermined energy for the actuator unit again, wherein the second geometric center point of the movable lens assembly relative to the third geometric center point of the housing frame is shifted again to the fixed offset location, thus the second geometric center point of the movable lens assembly is accurately aligned with the first geometric center point of the image sensing area.

Another one of the embodiments of the instant disclosure provides an image capturing module, comprising: an image sensing unit and an actuator unit. The image sensing unit includes a circuit substrate and an image sensing chip disposed on the circuit substrate and electrically connected to the circuit substrate, wherein the image sensing chip has an image sensing area formed on the top side thereof. The actuator unit includes a housing frame disposed on the circuit substrate of the image sensing unit and a movable lens assembly movably disposed inside the housing frame. More precisely, the image sensing area has a first geometric center line, the movable lens assembly has a second geometric center line, and a predetermined energy is provided for the actuator unit to accurately align the second geometric center line of the movable lens assembly with the first geometric center line of the image sensing area.

Yet another one of the embodiments of the instant disclosure provides an image capturing module, comprising: an image sensing unit and an actuator unit. The image sensing unit includes a circuit substrate and an image sensing chip disposed on the circuit substrate and electrically connected to the circuit substrate, wherein the image sensing chip has an image sensing area formed on the top side thereof. The actuator unit includes a housing frame disposed on the circuit substrate of the image sensing unit and a movable lens assembly movably disposed inside the housing frame. More precisely, the image sensing area has a first geometric center point, the movable lens assembly has a second geometric center point, and a predetermined energy is provided for the actuator unit to accurately align the second geometric center point of the movable lens assembly with the first geometric center point of the image sensing area.

Therefore, when the predetermined energy is provided for driving the actuator unit again, the center position of the movable lens assembly relative to the predetermined position point or the predetermined position line of the housing frame is shifted again to the fixed offset location, thus the center position (such as the second geometric center line or the second geometric center point) of the movable lens assembly can be accurately aligned with the center position (such as the first geometric center line or the first geometric center point) of the image sensing area of the image sensing chip.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Figure 1:
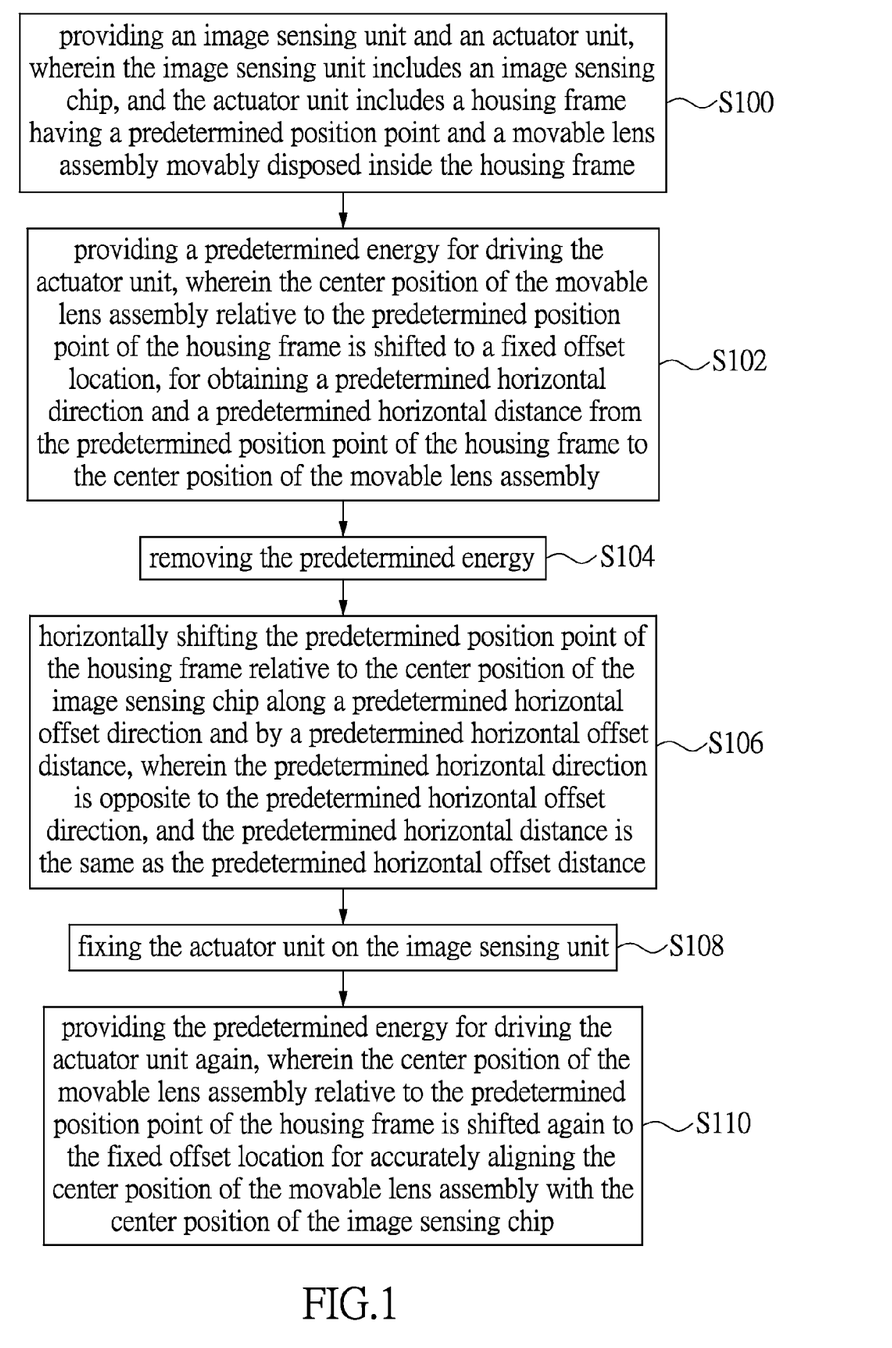
FIG. 1 shows a flowchart of the method of aligning and assembling the image capturing module according to the instant disclosure.
Figure 2A:
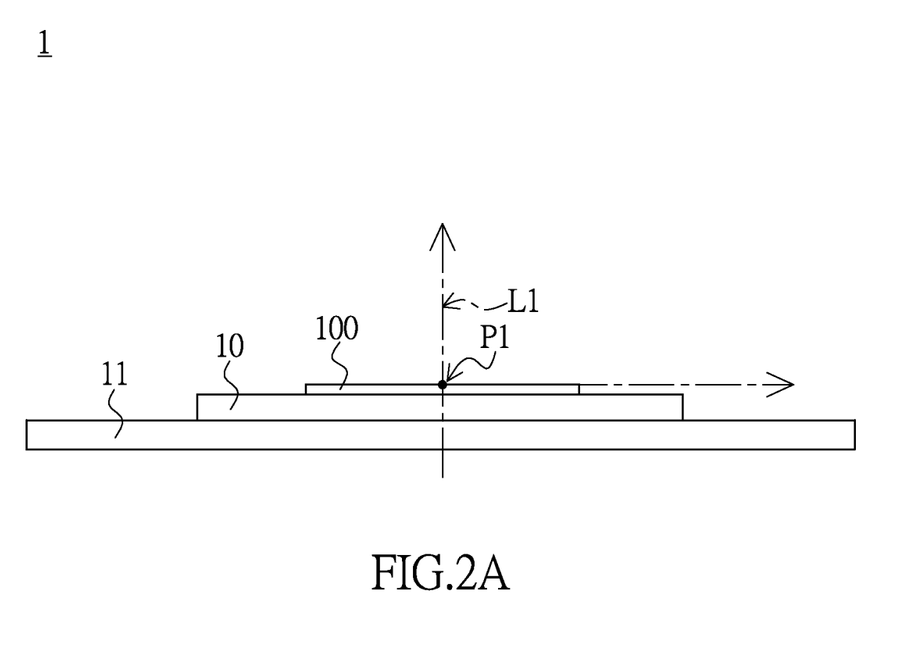
FIG. 2A shows a lateral, schematic view of the image sensing unit of the image capturing module according to the instant disclosure.
Figure 2B:
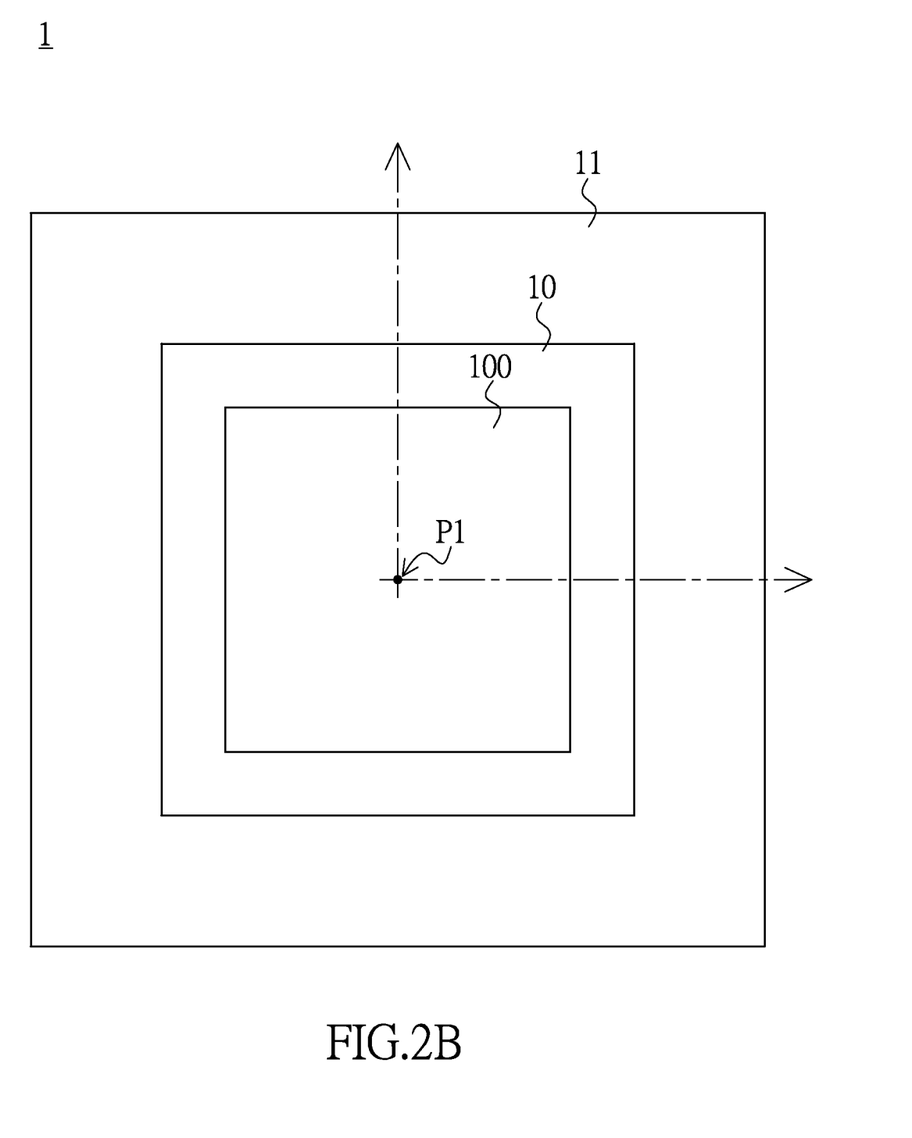
FIG. 2B shows a top, schematic view of the image sensing unit of the image capturing module according to the instant disclosure.

Referring to FIG. 1 to FIG. 7B, where the instant disclosure provides a method of aligning and assembling an image capturing module M (such as an alignment and assembly method for an image capturing module M), comprising the following steps:

First, step S100 is that: referring to FIG. 1, FIG. 2A to FIG. 3B, providing an image sensing unit 1 and an actuator unit 2, wherein the image sensing unit 1 includes an image sensing chip 10, and the actuator unit 2 includes a housing frame 20 having a predetermined position point or a predetermined position line and a movable lens assembly 21 movably disposed inside the housing frame 20. More precisely, the image sensing unit 1 includes a circuit substrate 11 for carrying the image sensing chip 10, and the image sensing chip 10 has an image sensing area 100 (or an image sensing region) formed on the top side thereof. The image sensing area 100 has a first geometric center line L1 and a first geometric center point P1 (as shown in FIG. 2A), and the movable lens assembly 21 has a second geometric center line L2 and second geometric center point P2 (as shown in FIG. 3A). For example, the housing frame 20 has an opening formed on the topmost side thereof, the predetermined position line of the opening of the housing frame 20 is a third geometric center line L3, and the predetermined position point of the opening of the housing frame 20 is a third geometric center point P3, but it is merely an example and is not meant to limit the instant disclosure.

Figure 3A:
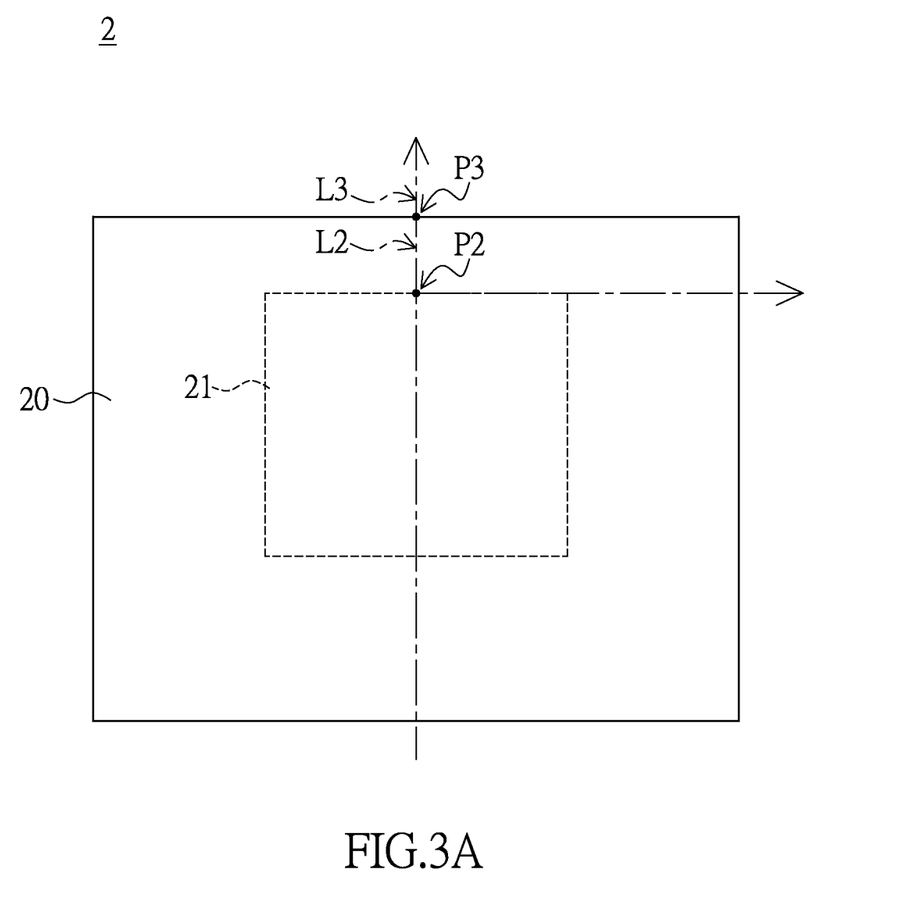
FIG. 3A shows a lateral, schematic view of the actuator unit of the image capturing module according to the instant disclosure.
Figure 3B:
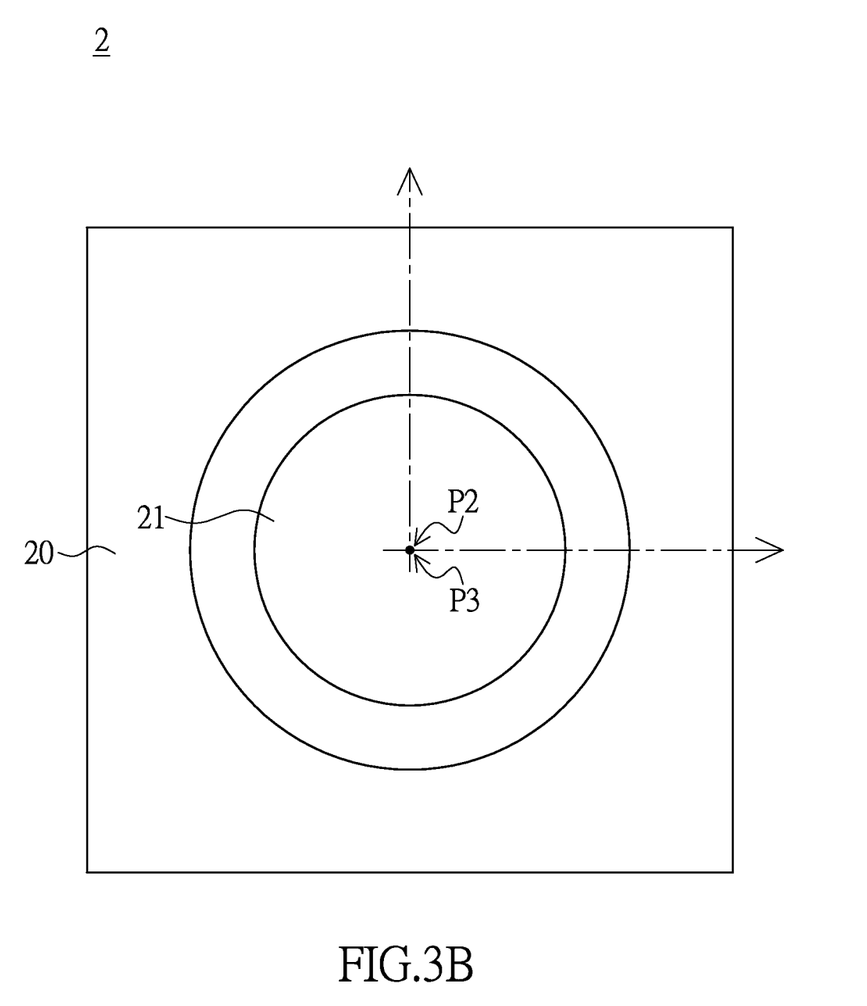
FIG. 3B shows a top, schematic view of the actuator unit of the image capturing module according to the instant disclosure.
Figure 4A:
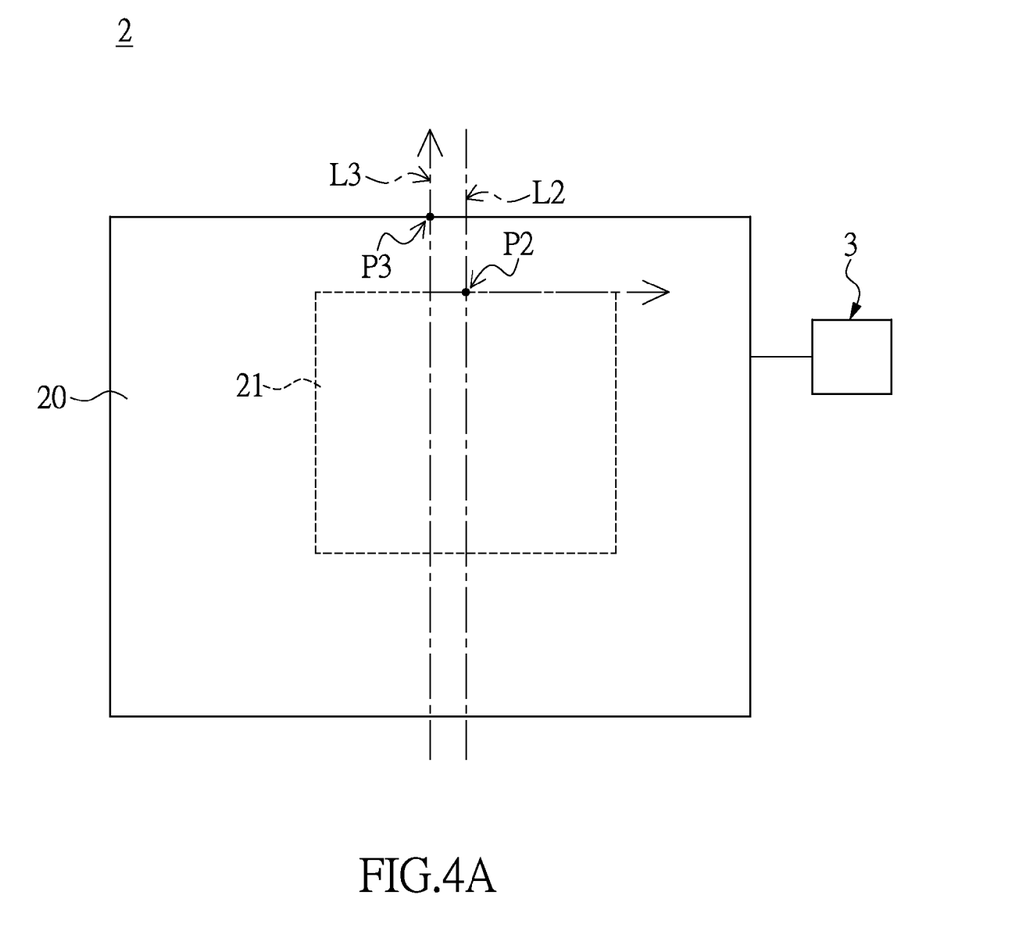
FIG. 4A shows a lateral, schematic view of the step S102 of the method of aligning and assembling the image capturing module according to the instant disclosure.
Figure 4B:
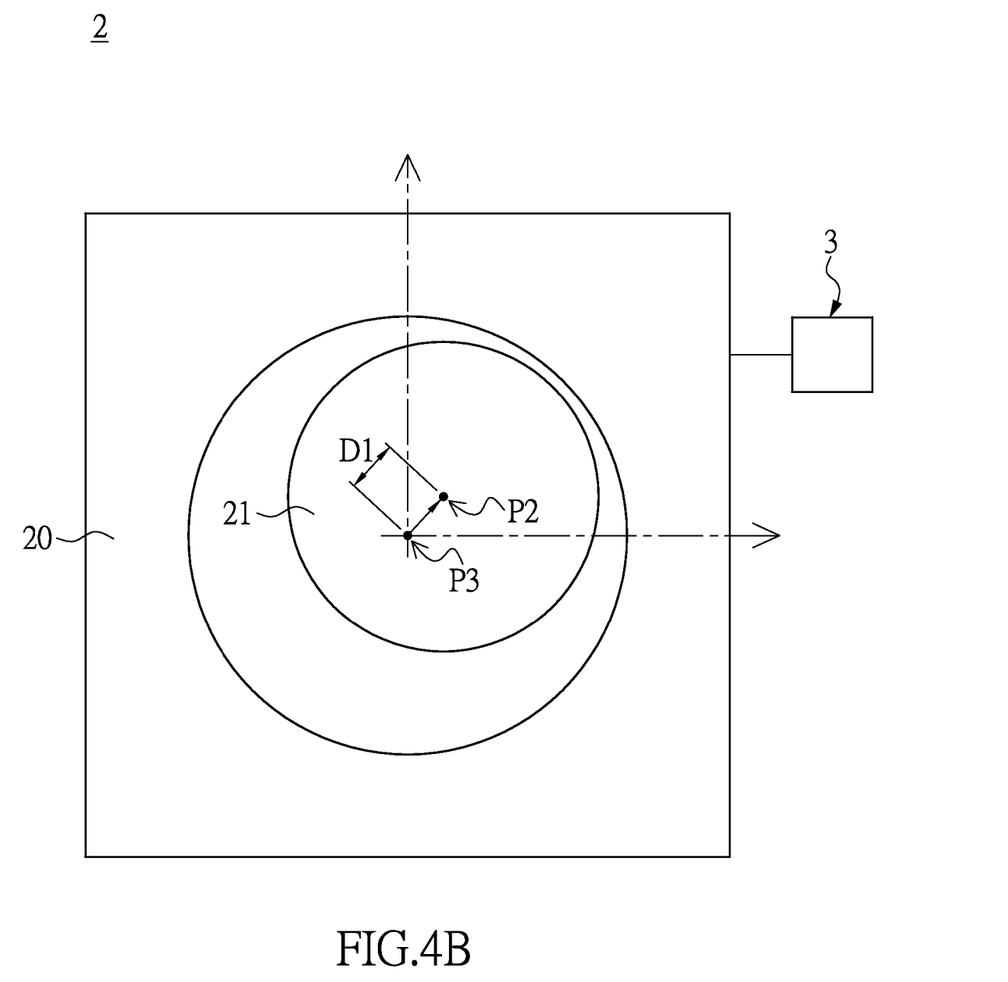
FIG. 4B shows a top, schematic view of the step S102 of the method of aligning and assembling the image capturing module according to the instant disclosure.

Next, step S102 is that: referring to FIG. 1, FIG. 3A to FIG. 4B, providing a predetermined energy for driving the actuator unit 2, wherein the center position of the movable lens assembly 21 relative to the predetermined position point or the predetermined position line of the housing frame 20 is shifted to a fixed offset location (i.e., the movable lens assembly 21 is shifted to a fixed offset location according to the direction of the solid arrow in FIG. 4B), for obtaining a predetermined horizontal direction and a predetermined horizontal distance D1 (as shown in FIG. 4A and FIG. 4B) from the predetermined position point or the predetermined position line of the housing frame 20 to the center position of the movable lens assembly 21. More precisely, the predetermined horizontal distance D1 is defined from the second geometric center line L2 of the movable lens assembly 21 to the third geometric center line L3 of the housing frame 20 (as shown in FIG. 4A), or the predetermined horizontal distance D1 is defined from the second geometric center point P2 of the movable lens assembly 21 to the third geometric center point P3 of the housing frame 20 (as shown in FIG. 4B). For example, the predetermined energy is a predetermined initial electrical energy generated by switching a sensor switch 3 on. Referring to FIG. 3A, when the actuator unit 2 has not been driven by a predetermined initial electrical energy generated by switching the sensor switch 3 (such as a hall effect sensor switch) on, the second geometric center line L2 of the movable lens assembly 21 and the third geometric center line L3 of the housing frame 20 are overlapping. Referring to FIG.

4A, when the actuator unit 2 has been driven by the predetermined initial electrical energy generated by switching the sensor switch 3 on, the second geometric center line L2 of the movable lens assembly 21 relative to the third geometric center line L3 of the housing frame 20 is horizontally shifted by a predetermined horizontal distance D1 (as shown in FIG. 4B).

Then, step S104 is that: referring to FIG. 1, FIG. 3A to FIG. 4B, removing the predetermined energy (i.e., removing the predetermined initial electrical energy generated from the sensor switch 3), wherein the movable lens assembly 21 is return to a position near the initial position after removing the predetermined energy. Hence, when the actuator unit 2 is driven by the predetermined energy, the offset direction (such as the predetermined horizontal direction of the solid arrow in FIG. 4B) and the offset distance (such as the predetermined horizontal distance D1 in FIG. 4B) of the second geometric center line L2 of the movable lens assembly 21 relative to the third geometric center line L3 of the housing frame 20 are obtained.

Figure 5A:
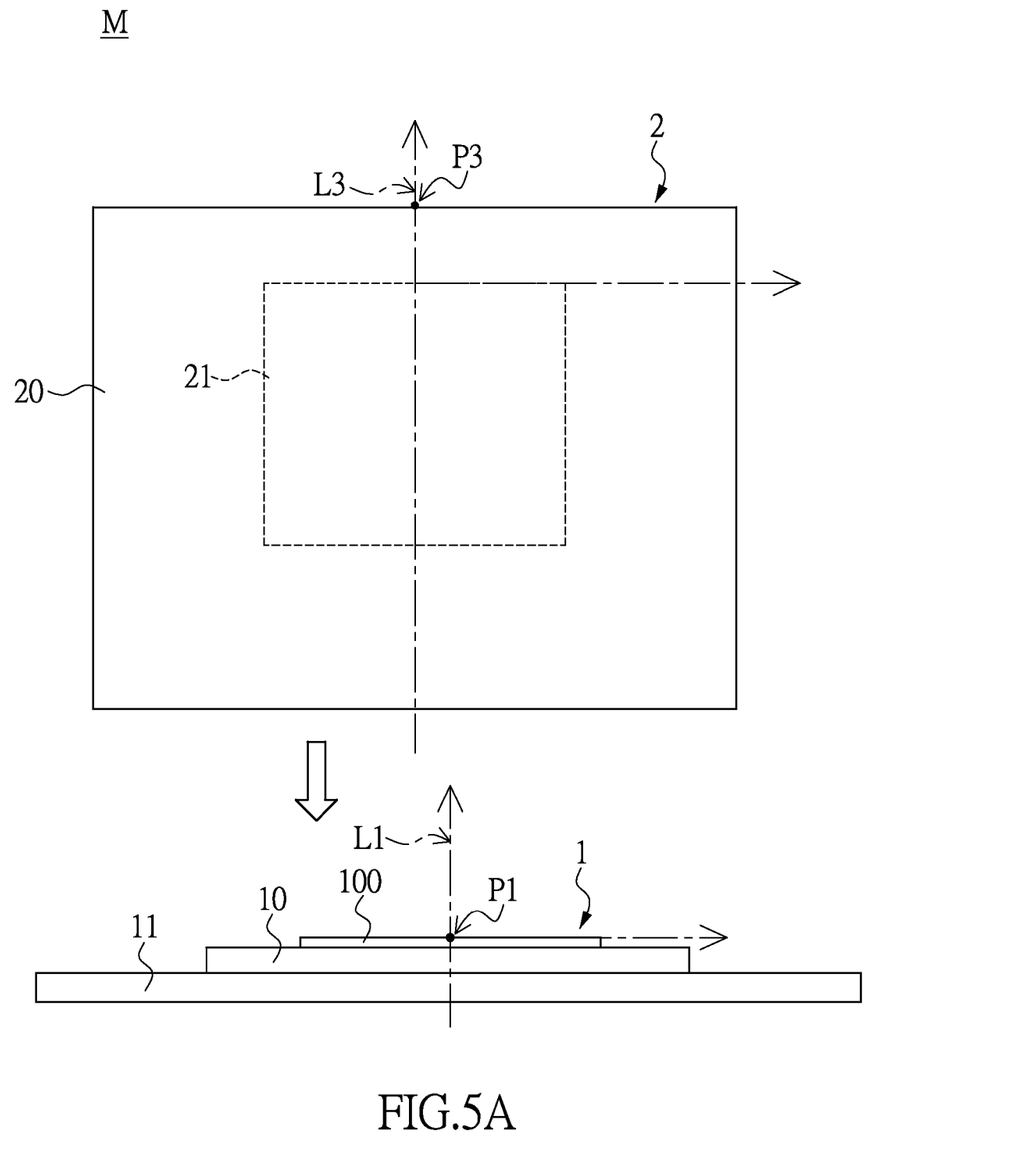
FIG. 5A shows a lateral, schematic view of the step S106 of the method of aligning and assembling the image capturing module according to the instant disclosure.
Figure 5B:
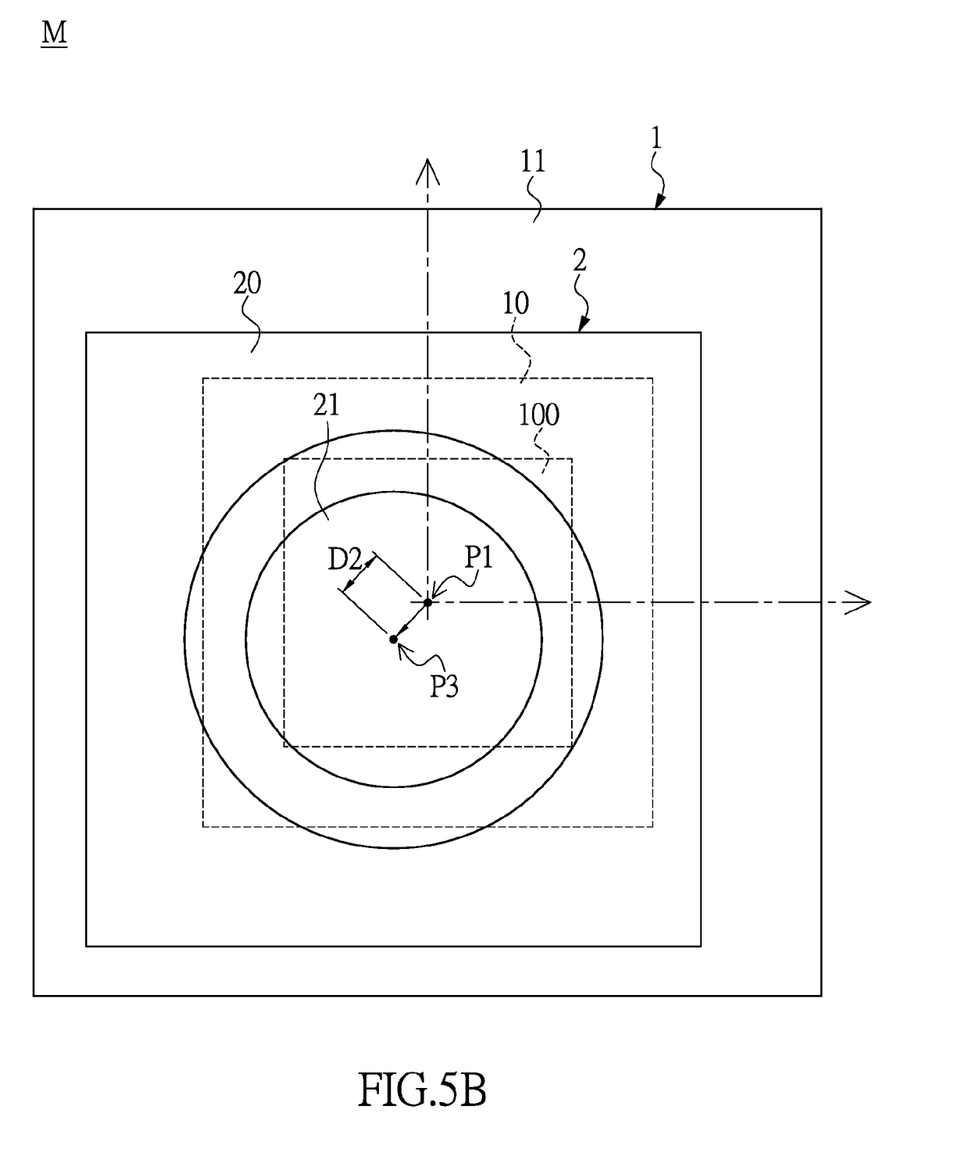
FIG. 5B shows a top, schematic view of the step S106 of the method of aligning and assembling the image capturing module according to the instant disclosure.

Afterward, step S106 is that: referring to FIG. 1, FIG. 5A and FIG. 5B, horizontally shifting the predetermined position point or the predetermined position line of the housing frame 20 relative to the center position of the image sensing chip 10 along a predetermined horizontal offset direction (such as the direction of the solid arrow in FIG. 5B) and by a predetermined horizontal offset distance D2 (as shown in FIG. 5A and FIG. 5B), wherein the predetermined horizontal direction (such as the direction of the solid arrow in FIG. 4B) is opposite to the predetermined horizontal offset direction (such as the direction of the solid arrow in FIG. 5B), and the predetermined horizontal distance D1 (as shown in FIG. 4B) is the same as the predetermined horizontal offset distance D2 (as shown in FIG. 5B). In other words, the predetermined horizontal direction and the predetermined horizontal offset direction are two different directions, and the predetermined horizontal distance D1 and the predetermined horizontal offset distance D2 are the same distance. More precisely, the predetermined horizontal offset distance D2 is defined from the third geometric center line L3 of the housing frame 20 to the first geometric center line L1 of the image sensing area 100 (as shown in FIG. 5A), or the predetermined horizontal offset distance D2 is defined from the third geometric center point P3 of the housing frame 20 to the first geometric center point P1 of the image sensing area 100 (as shown in FIG. 5A).

Figure 6A:
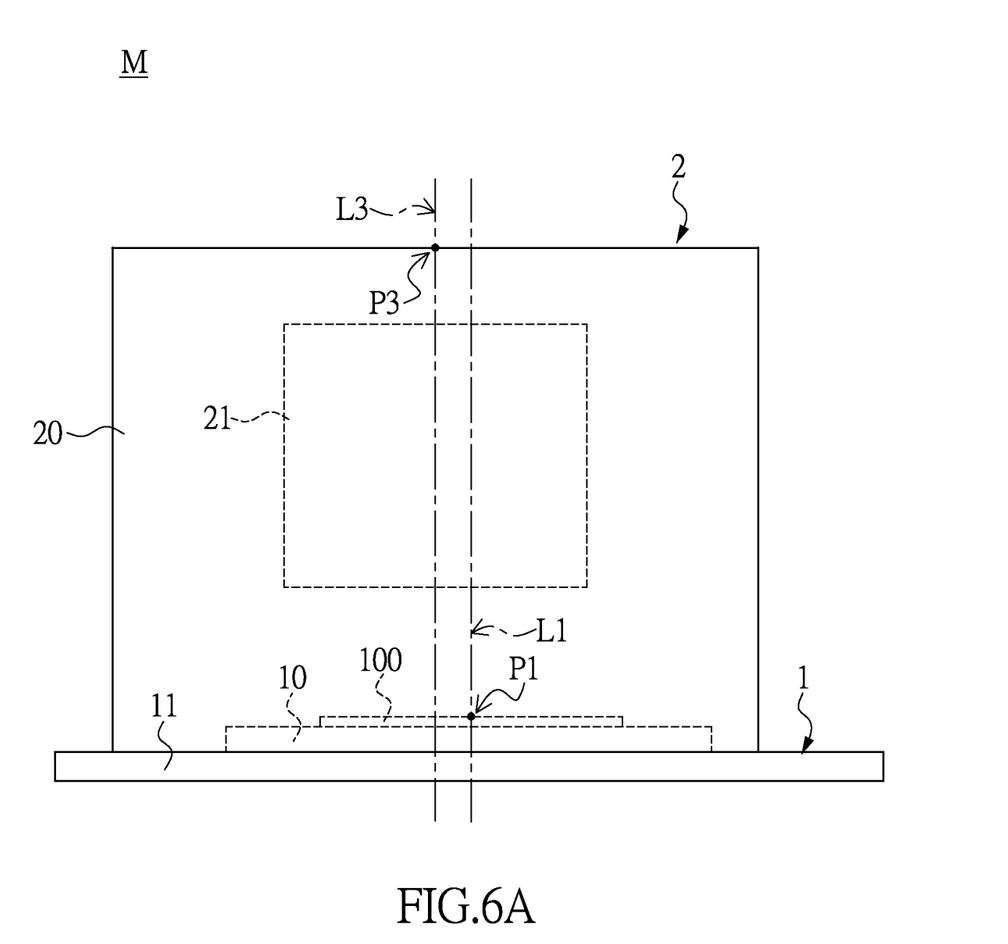
FIG. 6A shows a lateral, schematic view of the step S108 of the method of aligning and assembling the image capturing module according to the instant disclosure.
Figure 6B:
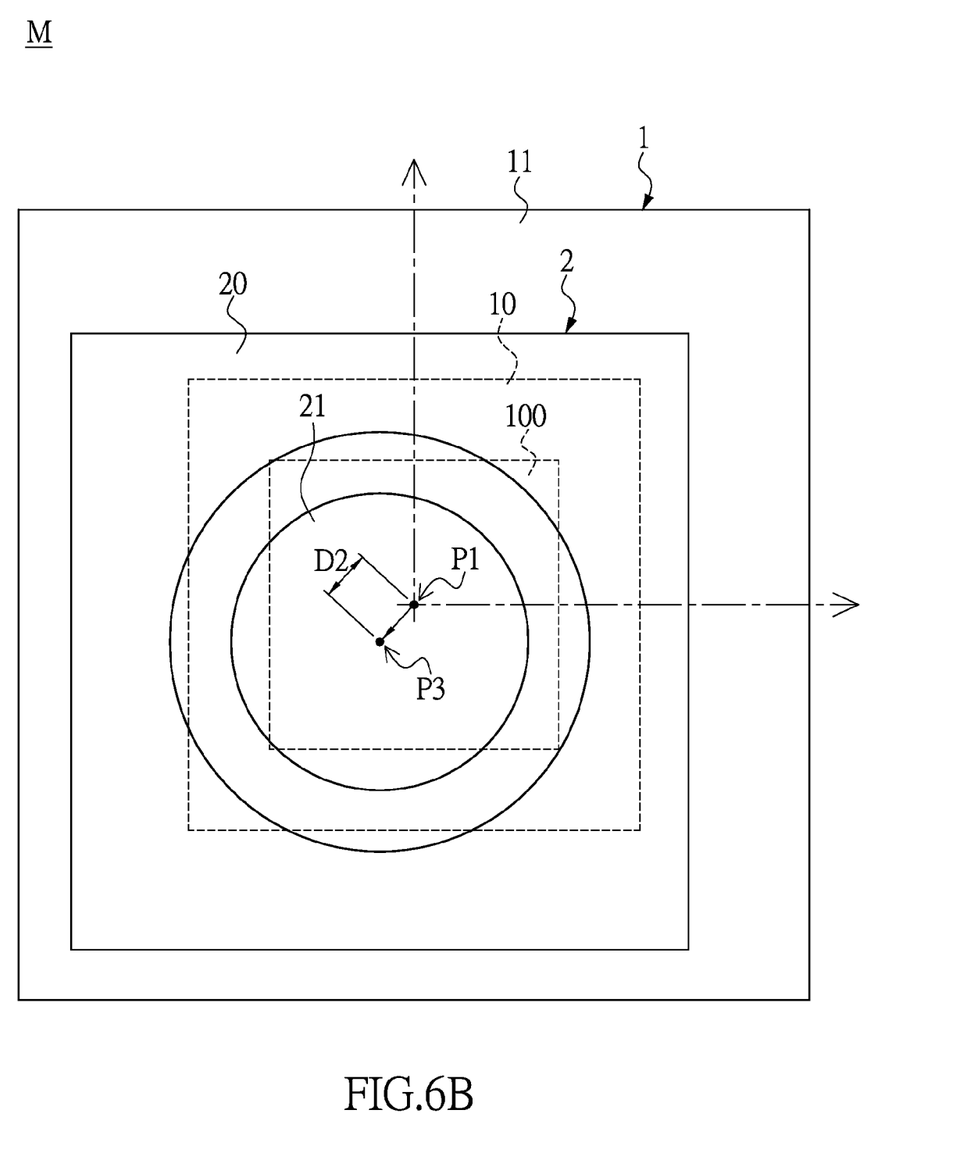
FIG. 6B shows a top, schematic view of the step S108 of the method of aligning and assembling the image capturing module according to the instant disclosure.

Next, step S108 is that: referring to FIG. 1, FIG. 6A and FIG. 6B, fixing the actuator unit 2 on the image sensing unit 1, when the predetermined position point or the predetermined position line of the housing frame 20 relative to the center position of the image sensing chip 10 has been horizontally shifted along the predetermined horizontal offset direction and by the predetermined horizontal offset distance D2. More precisely, after fixing the actuator unit 2 on the image sensing unit 1 (as shown in FIG. 6A), the third geometric center line L3 of the housing frame 20 relative to the first geometric center line L1 of the image sensing area 100 of the image sensing chip 10 is horizontally shifted by a predetermined horizontal offset distance D2 (as shown in FIG. 6B).

Figure 7A:
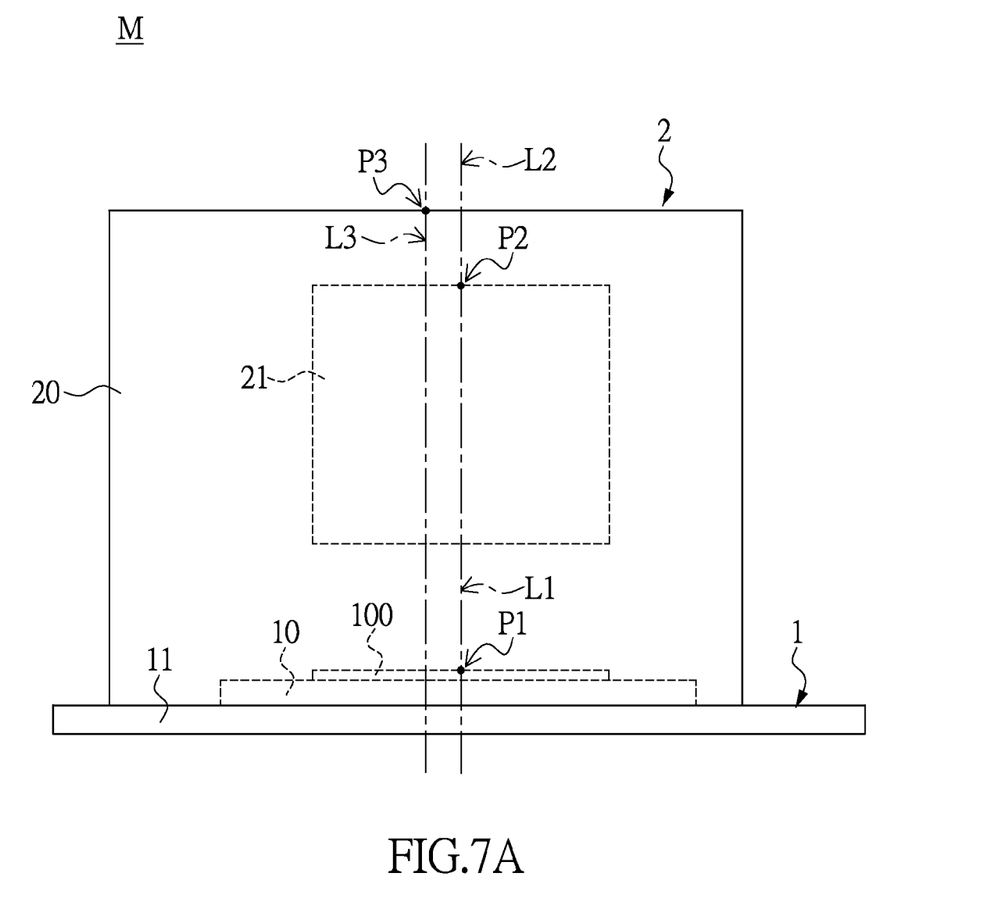
FIG. 7A shows a lateral, schematic view of the step S110 of the method of aligning and assembling the image capturing module according to the instant disclosure.
Figure 7B:
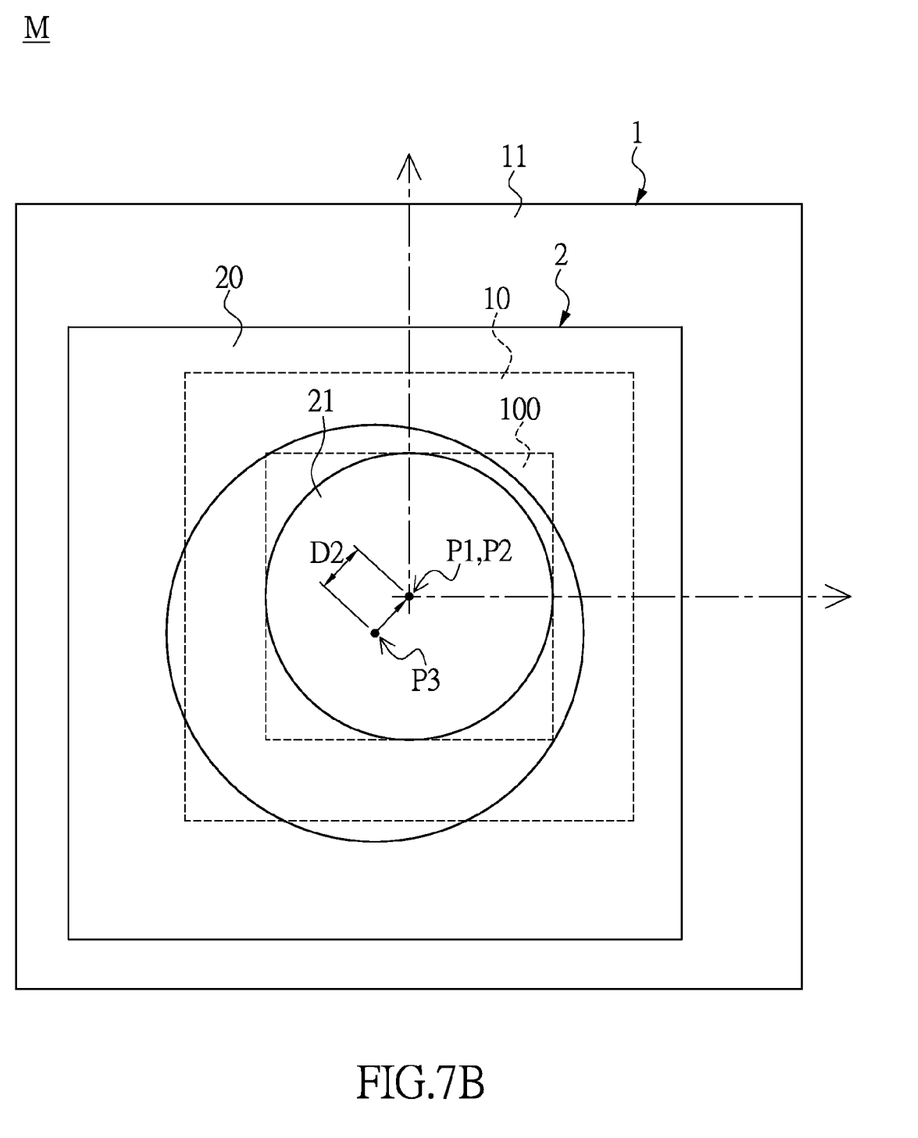
FIG. 7B shows a top, schematic view of the step S110 of the method of aligning and assembling the image capturing module according to the instant disclosure.

Then, step S110 is that: referring to FIG. 1, FIG. 7A and FIG. 7B, providing the predetermined energy for driving the actuator unit 2 again (i.e., turning on the sensor switch 3 to generate a predetermined initial electrical energy to drive the actuator unit 2), wherein the center position of the movable lens assembly 21 relative to the predetermined position point or the predetermined position line of the housing frame 20 is shifted again to the fixed offset location (i.e., the movable lens assembly 21 is shifted to the fixed offset location according to the predetermined horizontal direction and the predetermined horizontal distance D1 of the solid arrow in FIG. 7B), thus the center position of the movable lens assembly 21 is accurately aligned with the center position of the image sensing chip 10.

More precisely, after the step S108 of fixing the actuator unit 2 on the image sensing unit 1, the method further comprises: providing the predetermined energy for driving the actuator unit 2 again, wherein the second geometric center line L2 of the movable lens assembly 21 relative to the third geometric center line L3 of the housing frame 20 is shifted again to the fixed offset location, thus the second geometric center line L2 of the movable lens assembly 21 is accurately aligned with the first geometric center line L1 of the image sensing area 100. In other words, when the actuator unit 2 is driven again by the predetermined energy, the second geometric center line L2 of the movable lens assembly 21 relative to the third geometric center line L3 of the housing frame 20 is horizontally shifted again along the predetermined horizontal direction and by the predetermined horizontal distance D1, thus the second geometric center line L2 of the movable lens assembly 21 can be accurately aligned with the first geometric center line L1 of the image sensing area 100.

More precisely, after the step S108 of fixing the actuator unit 2 on the image sensing unit 1, the method further comprises: providing the predetermined energy for driving the actuator unit 2 again, wherein the second geometric center point P2 of the movable lens assembly 21 relative to the third geometric center point P3 of the housing frame 20 is shifted again to the fixed offset location, thus the second geometric center point P2 of the movable lens assembly 21 is accurately aligned with the first geometric center point P1 of the image sensing area 100. In other words, when the actuator unit 2 is driven again by the predetermined energy, the second geometric center point P2 of the movable lens assembly 21 relative to the third geometric center point P3 of the housing frame 20 is horizontally shifted again along the predetermined horizontal direction and by the predetermined horizontal distance D1, thus the second geometric center point P2 of the movable lens assembly 21 can be accurately aligned with the first geometric center point P1 of the image sensing area 100.

However, the above-mentioned design for aligning the image sensing unit 1 with the actuator unit 2 by using the first geometric center line L1 (or the first geometric center point P1) of the image sensing area 100, the second geometric center line L2 (or the second geometric center point P2) of the movable lens assembly 21 and the third geometric center line L3 (or the third geometric center point P3) of the housing frame 20 is merely an example and is not meant to limit the instant disclosure. For example, the predetermined position point or the predetermined position line of the housing frame 20 is disposed on an edge of the housing frame 20, such as an inner edge or an outer edge of the opening of the housing frame 20.

Figure 8:
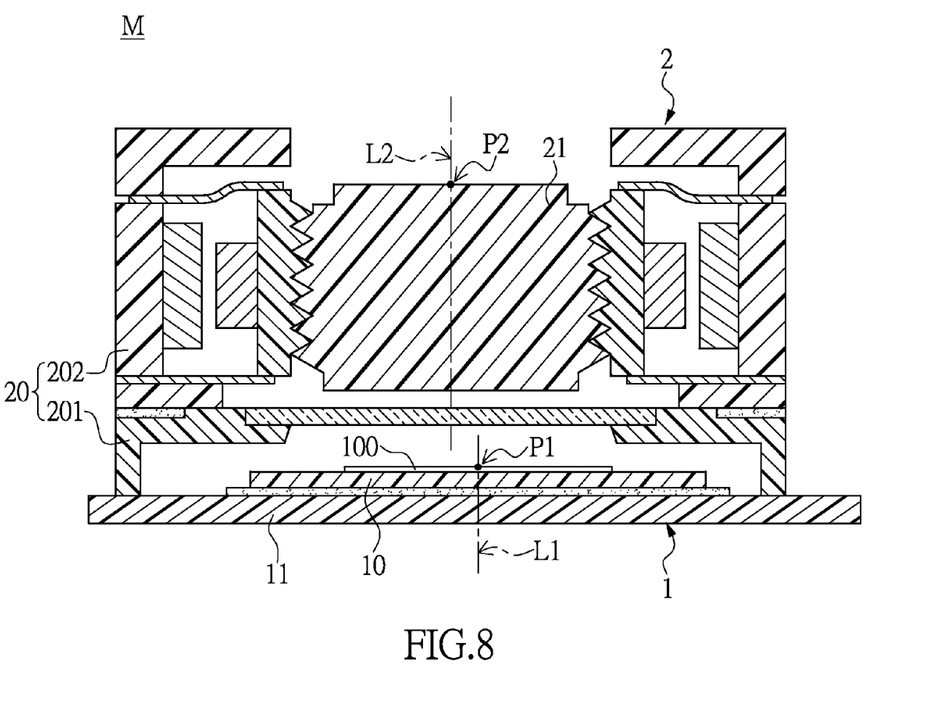
FIG. 8 shows a lateral, cross-sectional, schematic view of the image capturing module using a voice coil actuator according to the instant disclosure.

Therefore, referring to FIG. 8, according to the alignment and assembly method from the step S100 to step S110, the instant disclosure provides an image capturing module M, comprising: an image sensing unit 1 and an actuator unit 2 (such as a voice coil actuator, but is not meant to limit the instant disclosure). The image sensing unit 1 includes a circuit substrate 11 and an image sensing chip 10 disposed on the circuit substrate 11 and electrically connected to the circuit substrate 11, and the image sensing chip 10 has an image sensing area 100 formed on the top side thereof. The actuator unit 2 includes a housing frame 20 disposed on the circuit substrate 11 of the image sensing unit 1 and a movable lens assembly 21 movably disposed inside the housing frame 20.

In addition, the movable lens assembly 21 may be composed of many optical lenses (not shown), the housing frame 20 further includes a first holder 201 disposed on the image sensing unit 1 and a second holder 202 disposed on the first holder 201, and the movable lens assembly 21 can be moved inside the second holder 202 along XYZ three-axis directions.

For one example, the image sensing area 100 has a first geometric center line L1, and the movable lens assembly 21 has a second geometric center line L2. Referring to FIG. 7A, when the predetermined energy is provided for the actuator unit 2 to shift the movable lens assembly 21, the second geometric center line L2 of the movable lens assembly 21 can be accurately aligned with the first geometric center line L1 of the image sensing area 100.

For another one example, the image sensing area 100 has a first geometric center point P1, and the movable lens assembly 21 has a second geometric center point P2. Referring to FIG. 7A, when the predetermined energy is provided for the actuator unit 2 to shift the movable lens assembly 21, the second geometric center point P2 of the movable lens assembly 21 can be accurately aligned with the first geometric center point P1 of the image sensing area 100.

In conclusion, according to the designs of "providing a predetermined energy for driving the actuator unit 2 for obtaining a predetermined horizontal direction and a predetermined horizontal distance D1 from the predetermined position point or the predetermined position line of the housing frame 20 to the center position of the movable lens assembly 21" and "fixing the actuator unit 2 on the image sensing unit 1 after horizontally shifting the predetermined position point or the predetermined position line of the housing frame 20 relative to the center position of the image sensing chip 10 along the predetermined horizontal offset direction and by the predetermined horizontal offset distance D2", when the predetermined energy is provided for driving the actuator unit 2 again, the center position of the movable lens assembly 21 relative to the predetermined position point or the predetermined position line of the housing frame 20 is shifted again to the fixed offset location, thus the center position (such as the second geometric center line L2 or the second geometric center point P2) of the movable lens assembly 21 can be accurately aligned with the center position (such as the first geometric center line L1 or the first geometric center point P1) of the image sensing area 100 of the image sensing chip 10.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A method of aligning and assembling an image capturing module, comprising:
   providing an image sensing unit and an actuator unit, wherein the image sensing unit includes an image sensing chip, and the actuator unit includes a housing frame having a predetermined position point or a predetermined position line and a movable lens assembly movably disposed inside the housing frame;
   providing a predetermined energy for the actuator unit, wherein the center position of the movable lens assembly relative to the predetermined position point or the predetermined position line of the housing frame is shifted to a fixed offset location, for obtaining a predetermined horizontal direction and a predetermined horizontal distance from the predetermined position point or the predetermined position line of the housing frame to the center position of the movable lens assembly;
   removing the predetermined energy;
   horizontally shifting the predetermined position point or the predetermined position line of the housing frame relative to the center position of the image sensing chip along a predetermined horizontal offset direction and by a predetermined horizontal offset distance, wherein the predetermined horizontal direction is opposite to the predetermined horizontal offset direction, and the predetermined horizontal distance is the same as the predetermined horizontal offset distance; and
   fixing the actuator unit on the image sensing unit, when the predetermined position point or the predetermined position line of the housing frame relative to the center position of the image sensing chip has been horizontally shifted along the predetermined horizontal offset direction and by the predetermined horizontal offset distance.

2. The method of claim 1, after the step of fixing the actuator unit on the image sensing unit, further comprising: providing the predetermined energy for the actuator unit again, wherein the center position of the movable lens assembly relative to the predetermined position point or the predetermined position line of the housing frame is shifted again to the fixed offset location, thus the center position of the movable lens assembly is accurately aligned with the center position of the image sensing chip.

3. The method of claim 2, wherein the predetermined energy is a predetermined initial electrical energy generated by switching a sensor switch on.

4. The method of claim 1, wherein the image sensing unit includes a circuit substrate for carrying the image sensing chip, the image sensing chip has an image sensing area formed on the top side thereof, and the image sensing area has a first geometric center line, wherein the housing frame of the actuator unit is disposed on the circuit substrate of the image sensing unit, the movable lens assembly has a second geometric center line, and the predetermined position line of the housing frame is a third geometric center line.

5. The method of claim 4, wherein the predetermined horizontal distance is defined from the second geometric center line of the movable lens assembly to the third geometric center line of the housing frame, and the predetermined horizontal offset distance is defined from the third geometric center line of the housing frame to the first geometric center line of the image sensing area.

6. The method of claim 4, after the step of fixing the actuator unit on the image sensing unit, further comprising: providing the predetermined energy for the actuator unit again, wherein the second geometric center line of the movable lens assembly relative to the third geometric center line of the housing frame is shifted again to the fixed offset location, thus the second geometric center line of the movable lens assembly is accurately aligned with the first geometric center line of the image sensing area.

7. The method of claim 1, wherein the image sensing unit includes a circuit substrate for carrying the image sensing chip, the image sensing chip has an image sensing area formed on the top side thereof, and the image sensing area has a first geometric center point, wherein the housing frame of the actuator unit is disposed on the circuit substrate of the image sensing unit, the movable lens assembly has a second geometric center point, and the predetermined position point of the housing frame is a third geometric center point.

8. The method of claim 7, wherein the predetermined horizontal distance is defined from the second geometric center point of the movable lens assembly to the third geometric center point of the housing frame, and the predetermined horizontal offset distance is defined from the third geometric center point of the housing frame to the first geometric center point of the image sensing area.

9. The method of claim 7, after the step of fixing the actuator unit on the image sensing unit, further comprising: providing the predetermined energy for the actuator unit again, wherein the second geometric center point of the movable lens assembly relative to the third geometric center point of the housing frame is shifted again to the fixed offset location, thus the second geometric center point of the movable lens assembly is accurately aligned with the first geometric center point of the image sensing area.

10. The method of claim 1, wherein the predetermined position point or the predetermined position line of the housing frame is disposed on an edge of the housing frame.

* * * * *